United States Patent [19]
Umphenour et al.

[11] 3,908,699
[45] Sept. 30, 1975

[54] HIGH PRESSURE FLUID SUPPLY AND QUICK ACTION VALVE

[75] Inventors: Charles F. Umphenour; Reynaldo Calderon, both of Houston, Tex.

[73] Assignee: Texaco Inc., New York, N.Y.

[22] Filed: Jan. 28, 1974

[21] Appl. No.: 437,117

Related U.S. Application Data

[62] Division of Ser. No. 224,735, Feb. 9, 1972, Pat. No. 3,800,832.

[52] U.S. Cl. ............................................. 137/625.26
[51] Int. Cl.² .......................................... F16K 11/00
[58] Field of Search.. 251/282; 137/625.25, 625.26, 137/625.48, 625.49, 625.68; 181/.5 H

[56] References Cited
UNITED STATES PATENTS

| | | | |
|---|---|---|---|
| 2,594,664 | 4/1952 | Livers et al. ............... | 137/625.25 X |
| 2,893,428 | 7/1959 | Collins ....................... | 137/625.25 X |
| 3,074,433 | 1/1963 | Stark .......................... | 251/282 X |
| 3,684,238 | 8/1972 | Michellone ................. | 251/282 X |

Primary Examiner—Martin P. Schwadron
Assistant Examiner—Robert J. Miller
Attorney, Agent, or Firm—Thomas H. Whaley; Carl G. Ries; Theron H. Nichols

[57] ABSTRACT

A quick action firing assembly for charging and sudden release of gas under pressure in a seismic energy generator for offshore subsurface exploration, for example, comprising a hollow, elongated valve having equal and opposite surfaces and means for charging the generator through the valve with high pressure gas and simultaneously applying equal forces in opposite directions to the valve whereby a minimum of force is required to open the valve.

5 Claims, 2 Drawing Figures

U.S. Patent  Sept. 30,1975  3,908,699
FIG.1
FIG.2
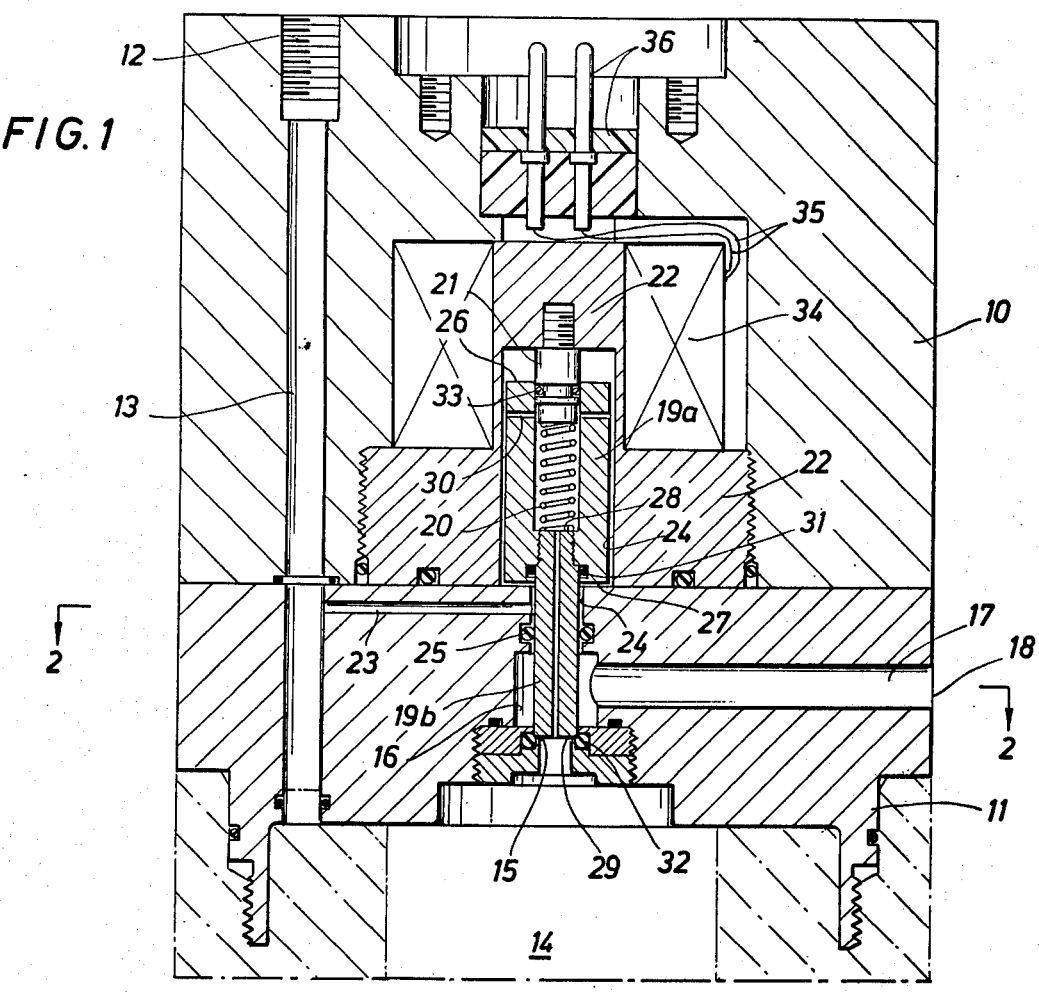
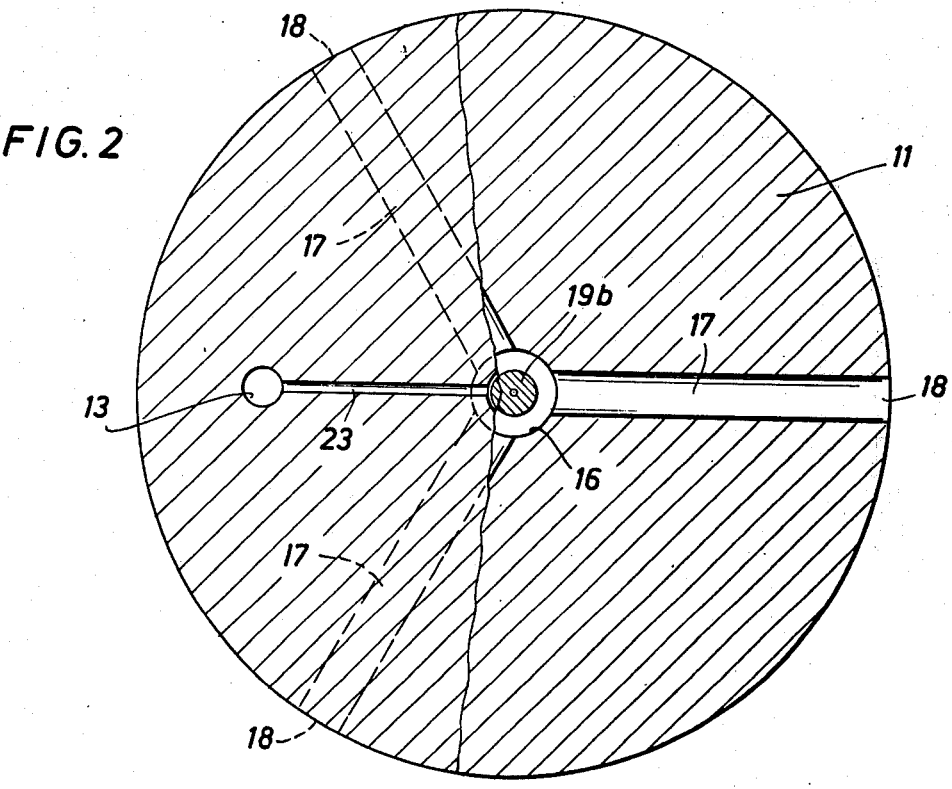

3,908,699

HIGH PRESSURE FLUID SUPPLY AND QUICK ACTION VALVE

This is a division of application Ser. No. 224,735, filed Feb. 9, 1972, now Pat. No. 3,800,832.

BACKGROUND OF THE INVENTION

Broadly the present invention relates to seismic exploration and to an improved pneumatic marine seismic energy source for the introduction of seismic energy into water from a floating vessel for supplying compressed air and having a geophysical crew thereon for exploring earth layers and formations underlying bodies of water as oceans, seas, lakes, rivers, or the like. More particularly this invention pertains to a method and at least one mechanism for carrying out the method, one exemplary mechanism being a quick action firing assembly for efficiently charging a seismic energy generator chamber with a high pressure gas and likewise for quickly and efficiently releasing the high pressure gas from the chamber with an expenditure of a minimum of energy or force.

While the method and apparatus of the invention are applicable for many purposes as will be set forth further below, they are illustratively disclosed and described as applied to underwater sound instrumentation such as oceanographic equipment and systems that are employed in seismic exploration of the world's crust under and adjacent to bodies of water.

Since water is such a good sound conductor, it is unnecessary to generate sound waves right on or in the ocean floor; they can be produced in the water near the surface. The pressure waves travel down through the water to the ocean floor and are reflected as in the usual echo-sounding techniques. However, these waves also penetrate into the ocean floor and are reflected from the sub-strata. These acoustical waves also propagate horizontally through one or more geological strata and may be recorded at a distance from the source, thus providing useful refraction data on the stratum or strata involved.

Although explosives for marine seismic work can put large amounts of energy into the water and obtain great depth of penetration, they do have drawbacks; they are dangerous to handle and use, and in some areas such as congested harbors, they cannot be used at all. Also, each "shot" is very expensive and can run into many thousands of dollars per survey. Explosives tend generally to concentrate substantial amounts of their energy output into higher frequency components which may not be desirable for many purposes; whereas, the sound impulse generation method and apparatus which the present invention is used on can be adjusted over a large amplitude range and adjusted in frequency so as to provide the desired spectrum distribution of sound frequencies for the purpose at hand.

The present invention is illustratively described as embodied in a device capable of emitting a large amount of acoustical energy into water in the form of a clear, repeatable pulse, the frequency and amplitude of which may be readily averred. These powerful sound impulses are well adapted for use in seismic exploration systems and also can be used to advantage for other purposes.

Seismic surveys which are conducted over water covered areas use various methods for generating seismic energy as by the detonating of conventional powder or dynamite, or gas mixtures, electrical discharge of sparks to ionize a portion of the water surrounding the electrode, or suddenly releasing a container of high pressure air underwater for generating a large seismic or pressure wave signal. These seismic signals are reflected from subsurface geological formations and structures and are received by seismometers and recorded.

In all methods utilized, it is customary to tow one or more detectors through the water in the vicinity of the sound source to detect the signals that are reflected from the various subsurface formations and structures. The detected signals are recorded on suitable equipment contained on the towing vessels, either in the form or analog or digital signals. Also, at times the signals are recorded as variable area signals to provide a profile of the surveyed area. The latter recording is similar to those contained with conventional depth-sounding equipment.

All of the above seismic methods and devices have various disadvantages and thus none is completely suitable for use in all circumstances. The handling of an explosive material is, of course, dangerous as mentioned previously, wherein the explosions themselves tend to kill much marine life, an example of a seismic explosive device being disclosed in U.S. Pat. No. 2,877,859. Also, in the case of dynamite two separate vessels are required; one for handling the dynamite and the other for the recording equipment. This, of course, increases the cost of the survey.

Aside from the operational advantages over conventional dynamite surveys, the disclosed system affords better data acquisition through the effective and quicker acting pressure release valve having less back pressure to work against and requiring less power or voltage to actuate the actuating solenoid for firing a seismic acoustical energy generator or air gun.

The use of explosive gas mixture solves some of the problems that arise with dynamite, since explosive gas mixtures do not kill as much marine life, a further example being disclosed in U.S. Pat. No. 3,620,327. Normally, gas mixtures can be stored as separate, non-explosive gases on the same vessel that contains the recording equipment. Thus, the need for an additional vessel or the possibility of killing marine life is reduced. While one disadvantage of gas type sound sources is the relatively short life of the flexible container or sleeve in which the explosive gas mixtures are detonated, conservation of the present environment is one of the principal problems.

In sound sources employing an electrical discharge, it has been customary to discharge a bank of capacitors charged to a high voltage through a single electrode or multiple parallel electrodes and a ground plate. When the capacitor bank is discharged into the water by the electrodes and ground plate the pressure bubble is produced at each electrode tip, for the ground plate serves as a return for the electrical energy. The pressure bubble produces the desired seismic impulse while the ground adds nothing to the magnitude of the outgoing acoustical wave. In fact, only 3–5 percent of the total electrical energy available in the capacitor bank is converted to useful acoustical energy in the water. Further, many spark electrodes in parallel may be used simultaneously as disclosed in U.S. Pat. No. 3,613,823.

DESCRIPTION OF PRIOR ART

While compressed pneumatic guns as disclosed in U.S. Pat. Nos. 3,276,534 and 3,379,273 and assignees' application Ser. No. 160,693, filed July 8, 1971, each has a passage through the plunger for the passage of air, none have the feature of equal and opposite areas normal to the longitudinal axis of the plunger for insuring a minimum required force to actuate the plunger to release the compressed air. The most pertinent disclosure, assignees' above identified application, illustrates an air gun in which a larger area and resultant force tending to maintain the plunger closed, in addition to the spring, must be overcome to open the valve, whereas the instant invention has only the force of the spring to overcome, resulting in a much faster operating seismic energy generator requiring less power or voltage to operate the solenoid for actuation of the valve.

OBJECTS OF THE INVENTION

A primary object of this invention is to provide a method for charging a chamber with high pressure fluid and for quickly releasing the fluid with a minimum force.

Another primary object of this invention is to provide a device for carrying out the above method comprising a valve assembly for charging a chamber with high pressure fluid and simultaneously applying equal and opposite forces to the valve for requiring a minimum of valve opening forces.

Another object of this invention is to provide a hollow, spring loaded valve for supplying gas under pressure to a chamber and a means for applying an equal force in both directions to the valve whereby a minimum force is required to open the valve.

A further object of this invention is to provide a valve having equal and opposite areas and means for applying a fluid pressure for developing equal and opposite forces on the valve so that a minimum force is required to open the valve.

Still another object of this invention is to provide an air gun firing assembly for a seismic energy source which is easy to operate, is of simple configuration, is economical to build and assemble, and is of greater efficiency for charging a seismic energy generator and for suddenly releasing the gas under high pressure for offshore subsurface exploration.

Other objects and various advantages of the disclosed firing assembly for an acoustical energy generator for offshore subsurface exploration will be apparent from the following detailed description, together with accompanying drawing, submitted for purposes of illustration only and not intended to define the scope of the invention, reference being had for that purpose to the subjoined claims.

BRIEF DESCRIPTION OF THE DRAWING

The drawing diagrammatically illustrates by way of example, not by way of limitation, one form of the invention wherein like reference numerals have been employed to indicate similar parts in the several views in which:

FIG. 1 is a schematic sectional view of an embodiment of the new seismic energy generator having the new firing mechanism therein; and FIG. 2 is a sectional view at 2—2 on FIG. 1.

DESCRIPTION OF THE PREFERRED METHOD OF THE INVENTION

The invention disclosed herein, the scope of which being defined in the appended claims, is not limited in its application to the details of construction and arrangement of parts shown and described for carrying out the method, since the invention is capable of other embodiments for carrying out other methods and of being practiced or carried out in various other ways. Also, it is to be understood that the phraseology or terminology employed herein is for the purpose of description and not of limitation. Further, many modifications and variations of the invention as hereinbefore set forth may occur to those skilled in the art. Therefore, all such modifications and variations which are within the spirit and scope of the invention herein are included and only such limitations should be imposed as are indicated in the appended claims.

This invention comprises both a method and a device for carrying out the method of charging a chamber with high pressure gas and for quickly releasing the gas with a minimum force.

This method comprises the steps of:

1. charging the chamber with high pressure fluid through a hollow closed valve, and
2. simultaneously applying equal forces in opposite directions to the valve so that only a minimum of force is required to open the valve for quick release of the fluid.

Step 2 comprises in greater detail:

1. applying fluid under pressure to equal areas of the valve in opposite directions simultaneously with charging of the chamber.

Modifying the second method step or adding a third method step comprises:

a. cutting off flow of high pressure fluid to the chamber simultaneously with applying equal forces in opposite directions to the valve whereby only a minimum force is required to open the valve.

DESCRIPTION OF THE PREFERRED EMBODIMENT

While various articles may be utilized for carrying out the above method of the invention, the preferred embodiment comprises a quick-action valve assembly for sudden release of gas under pressure from an inlet-exit port of a chamber of a seismic acoustical energy generator. Likewise, this valve assembly is utilized also for charging the high pressure chamber.

The disclosed firing assembly comprises, as shown in FIG. 1, a cylindrical housing 10 for containing the firing assembly and for attaching to a conventional acoustical pneumatic energy generator 11.

A typical seismic wave generator 11, FIG. 1, is lowered into the surrounding earth, marsh, or water, offshore or down in a conventional shot hole filled with water, for example. While FIG. 1 illustrates the position of the seismic energy generator in the vertical position for shothole seismic surveying when being towed for offshore subsurface exploration, the generator would be rotated clockwise 90°.

The circular housing 10, FIG. 1, has an inlet 12 at the top connected to a suitable source of high pressure fluid, such as air, which is supplied to main passage 13 for distribution to the air gun 11, and particularly to a high pressure air chamber (not shown) at the bottom of the air gun and to a firing mechanism at the top of the air gun.

The air gun has a smaller chamber 14 having an inlet-exit port or opening 15, outlet passages 16 and 17, and exhaust port 18 from which the expanding air rushes out to the surrounding water. The chamber inletexit port 15 is shown closed by the new hollow plunger valve 19.

The hollow plunger valve 19 comprises two parts, a larger hollow lower body upper part 19a for enclosing a spring 20 and a smaller hollow part or plunger stem 19b screwed into the plunger body. The body 19a of the plunger is slidable over a stud 21 screwed in plunger valve guide 22 in housing 10. Thus, when the plunger valve is moved upwardly and opened, the high pressure air may escape from chamber 14 out through exhaust passages 16 and 17 to exit from the exhaust port 18 to escape out into the surrounding water. As shown in FIG. 2, three sets of exhaust passages are preferable. The hollow plunger is shown closing the opening and is held in closed position with the spring 20.

High pressure air from the supply passage 13 likewise travels transversely through a firing assembly first passage 23 to a annular second passage 24 around the portion 19b of the plunger. While a sloppy fit is shown between the cylindrical portion 19b and the walls of the passage 24, FIG. 1, leakage of the air downwardly and outwardly to outlet passages 16 and 17 is prevented by sealing O-ring 25 in the housing. From there the air travels through a larger portion of the annular second passage 24 surrounding the plunger larger portion 19a. Both upper and lower flat ends 26 and 27, respectively, of the larger portion 19a of the plunger and the flat ends 28 and 29, respectively, of the smaller portion 19b are formed to the same identical areas, respectively, and are normal to the longitudinal axis of the plunger. Thus, as the air under pressure passes through the annular passage 24 around the smaller and larger portions of the plunger, and since these air passages are formed with a sloppy fit, as illustrated in FIG. 1, resulting in negligible air resistance, the air correspondingly arrives at both ends of each of the two valve portions 19a and 19b practically simultaneously and accordingly the forces are neutralized for actuating the plunger in either direction. Third passages 30 extend from this second cylindrical passage 24 to the interior of the hollow plunger valve 19. From the hollow portion of the plunger the air passes to the chamber for charging it with high pressure air. Respective O-rings 31 and 32 for sealing are provided between the two portions 19a and 19b of the plunger valve and in the air gun around the inlet-exit opening 15 of the chamber, respectively.

A solenoid 34 is mounted in the housing around at least a portion of the plunger and has electrical wires 35 passing to electrical plug 36 for plugging into a suitable energy source for energizing the solenoid. Further, an O-ring 33 is mounted around the end of the stud that protrudes into the plunger. Upon actuation of the solenoid 34, the plunger 19a is moved upwardly in plunger guide 22, the spring 20 is compressed, and the plunger third passages 30 are sealed closed by the stud O-ring 33. When these latter passages are closed, no fluid is allowed to flow internally of the plunger nor to pass out of the plunger to charge the attached air gun. With equal pressure on equal and opposite plunger ends, the solenoid has to overcome only the force of the spring to actuate plunger valve 19 to open chamber inlet-exit port 15, the friction and drag of the air passing through the passages being negligible.

FIG. 2, a sectional view of 2—2 on FIG. 1, illustrates the requirement of three sets of outlet passages and exhaust ports, 17 and 18, respectively, while only one transverse high pressure fluid passage 23 is required.

Thus in operation, as high pressure fluid passes through the main passage 13 to charge the high pressure chamber of the air gun, this high pressure fluid or air also simultaneously passes through the first transverse passage 23 and from there it flows to the second passage 24, and continues on through the third passages 30 of the plunger into the internal or hollow portion of the plunger valve. From here the high pressure air flows the length of the plunger valve through chamber inlet-exit port 15 to further charge the chamber.

It may be noted that the force of the spring is the only means required and utilized for holding and maintaining the plunger valve against the opening and for sealing the opening. With the plunger in this position, either equal hydraulic or pneumatic pressure is applied to both opposite ends of both plunger valve parts and accordingly equal and opposite forces are applied thereto, which counteracting forces maintaining the plunger at either of its positions. To fire the air gun, the solenoid is energized which then jerks with a minimum of force the plunger upwardly and away from the inlet-exit port 15. The action of the solenoid is only opposed by the spring in that immediately upon upward actuation of the plunger the third passages are closed by O-ring 33, thereby cancelling out or stopping the flow of high pressure fluid through the center of the plunger and the pneumatic pressure maintains equal and opposite forces on the ends of the plunger valve. Accordingly, upon actuation of the plunger upwardly the high pressure fluid from the chamber is allowed to rush out of the opening 15 through the exhaust passages 16 and 17 and out the exhaust port 18 to the surrounding water for triggering the attached air gun for generating the acoustical seismic sound wave for subsurface exploration. When the plunger is at either of its end positions, and pneumatic forces are equalized due to being applied to both ends of the plunger, a minimum of force is required to open the plunger valve. Thus a high pressure air supply and quick-action valve assembly is disclosed for charging a chamber having an inlet-exit port and for suddenly exhausting the high pressure air therefrom.

Accordingly, it will be seen that the present firing assembly for the seismic energy source for offshore subsurface exploration operates in a manner which meets each of the objects set forth hereinbefore.

While only one method and one embodiment for carrying out the method of the invention have been disclosed, it will be evident that various other methods and modifications are possible in the arrangement and construction of the disclosed firing assembly for a seismic energy generator for offshore subsurface exploration without departing from the scope of the invention, and it is accordingly desired to comprehend within the purview of this invention such modifications as may be considered to fall within the scope of the appended claims.

We claim:

1. A high pressure fluid supply and quick action valve assembly for charging a chamber having an inlet-exit port, supply passage means to said chamber and exhaust passage means from said chamber comprising,
  a. hollow elongated valve means having two-directional movement along its longitudinal axis and being spring biased in one direction against said inlet-exit port for charging said chamber with high pressure fluid,
  b. fluid pressure passage means for applying an equal force in both of said directions to said hollow elongated valve means so that a minimum force is required to open said inlet-exit port,
  c. said hollow elongated valve means being movable rapidly in a second direction to open said inlet-exit port suddenly for exhausting said high pressure fluid therefrom,
  d. said hollow elongated valve means comprises a hollow elongated plunger slidably mounted in a housing containing said chamber,
  e. said hollow elongated plunger having equal and opposite areas normal to said longitudinal axis for said equal and opposite forces to be applied thereto,
  f. said hollow elongated plunger comprising first and second hollow elongated elements having inner and outer ends, the inner end of said second element being secured in the inner end of said first element,
  g. a stud fixed to said housing and protruding therefrom into the outer end of said first element, and
  h. a spring positioned in said first element between said stud and said inner end of said second element for spring biasing said outer end of said second element against said inlet-exit port for charging said chamber with high pressure fluid.

2. A high pressure fluid supply and quick action valve assembly for charging a chamber having an inlet-exit port supply passage means to said chamber and exhaust passage means from said chamber comprising,
  a. hollow elongated valve means having two-directional movement on its longitudinal axis and being spring biased in one direction against said inlet-exit port for charging said chamber with high pressure fluid,
  b. fluid pressure passage means for applying an equal force in both of said directions to said hollow elongated valve means so that a minimum force is required to open said inlet-exit port,
  c. said hollow elongated valve means being movable rapidly in a second direction to open said inlet-exit port suddenly for exhausting said high pressure fluid therefrom,
  d. said fluid pressure passage means comprises a first fluid passage through the length of said hollow elongated plunger means for pressurizing and charging said chamber,
  e. said hollow elongated plunger means has equal and opposite areas normal to its longitudinal axis,
  f. said fluid pressure passage means comprises a second passage to said equal and opposite areas on said hollow elongated plunger means for applying equal and opposite forces longitudinally to said hollow elongated plunger means,
  g. said fluid pressure passage means comprises a third passage transversely through said hollow elongated plunger means interconnecting said first and second passages for charging and pressurizing said chamber,
  h. actuating means,
  i. said hollow elongated plunger means being responsive to said actuating means for closing said third passage for stopping the flow of pressurized fluid to said chamber, and
  j. said housing has stud means for closing said third passage as said hollow elongated plunger means is moved in one of said two directions on its longitudinal axis for stopping the flow of pressurized fluid to said chamber.

3. A high pressure fluid supply and quick action valve assembly as recited in claim 1 wherein,
  a. said fluid pressure passage means comprises a fluid passage to said equal and opposite areas on said hollow elongated plunger means for applying equal and opposite longitudinal forces to said hollow elongated plunger means.

4. A high pressure fluid supply and quick action valve assembly as recited in claim 1 wherein,
  a. the valve assembly has actuating means, and
  b. said hollow elongated plunger means is responsive to said actuating means for opening said inlet-exit port for quick release of pressurized fluid from said chamber.

5. A high pressure fluid supply and quick action valve assembly as recited in claim 2 wherein,
  a. said hollow elongated plunger means is responsive to said actuating means for opening said inlet-exit port for quick release of pressurized fluid from said chamber.

* * * * *